United States Patent
Müller et al.

(10) Patent No.: US 6,905,644 B1
(45) Date of Patent: Jun. 14, 2005

(54) PROCESS AND DEVICE FOR PRODUCING COMPONENTS AND SEMIFINISHED PRODUCTS FROM SYNTHETIC GRAPHITE OR CERAMIC GRANULES, IN PARTICULAR FOR PRODUCING GRAPHITE TUBES

(75) Inventors: Holger Müller, Radegast (DE); Jürgen Künzel, Thierhaupten (DE); Manfred Schmid, Augsburg (DE)

(73) Assignee: SGL Carbon AG, Wiesbaden (DE)

( * ) Notice: Subject to any disclaimer, the term of this patent is extended or adjusted under 35 U.S.C. 154(b) by 344 days.

(21) Appl. No.: 09/936,067

(22) PCT Filed: Nov. 24, 2000

(86) PCT No.: PCT/EP00/11751
§ 371 (c)(1),
(2), (4) Date: Jan. 23, 2002

(87) PCT Pub. No.: WO01/49633
PCT Pub. Date: Jul. 12, 2001

(30) Foreign Application Priority Data

Jan. 5, 2000 (DE) .......................... 100 00 165

(51) Int. Cl.⁷ ............................................. B29C 47/00
(52) U.S. Cl. .................. 264/108; 264/40.7; 264/177.2; 264/211.11
(58) Field of Search .......................... 264/108, 177.11, 264/40.7, 177.2, 211.11, 294

(56) References Cited

U.S. PATENT DOCUMENTS

| 2,269,436 A | | 1/1942 | Christopher | |
|---|---|---|---|---|
| 3,267,518 A | | 8/1966 | Juel et al. | |
| 3,666,847 A | | 5/1972 | Bailey | |
| 3,676,535 A | | 7/1972 | Juel | |
| 3,689,614 A | * | 9/1972 | Bortz et al. | ............. 264/636 |
| 3,874,837 A | * | 4/1975 | Jamieson | ............. 425/378.1 |
| 3,888,958 A | * | 6/1975 | Juntgen et al. | ............. 264/29.7 |
| 4,521,360 A | * | 6/1985 | Fiorentino | ............. 264/108 |
| 6,261,495 B1 | * | 7/2001 | McCullough et al. | ....... 264/108 |

FOREIGN PATENT DOCUMENTS

| DE | 961 729 | 10/1956 |
|---|---|---|
| DE | 1 132 896 | 7/1962 |
| DE | 1 945 981 | 3/1970 |
| DE | 31 16 309 C2 | 11/1982 |
| DE | 197 47 757 A1 | 1/1999 |
| EP | 0 216 978 A1 | 4/1987 |

* cited by examiner

*Primary Examiner*—Mark Eashoo
(74) *Attorney, Agent, or Firm*—Laurence A. Greenberg; Werner H. Stemer; Ralph E. Locher

(57) ABSTRACT

This invention relates to a process and a device for producing components and semi-finished products from synthetic graphite or from ceramic granules, in particular for producing graphite tubes, involving shaping of a material to be mixed preferably containing petroleum coke or graphite granules, by means of an extrusion press (22) or an extruder, wherein the process provides the following steps:

a) Pre-pressing the material (20) to be mixed in static or quasi-static manner, flow movements of the material (20) to be mixed being stopped or impeded in such a way that particles previously irregularly arranged in the material to be mixed are initially aligned transversely to the direction of pressing, b) Pressing out of the pre-pressed material (20) to be mixed through an outlet opening (28) of the extrusion press (22) or the extruder in such a way that owing to adjusted flow properties of the material (20) to be mixed, the particles within the pre-compressed material (20) to be mixed realign, starting from their transverse alignment, by an angle (β) of a maximum of 75° in the direction of pressing.

10 Claims, 3 Drawing Sheets

PROCESS AND DEVICE FOR PRODUCING COMPONENTS AND SEMIFINISHED PRODUCTS FROM SYNTHETIC GRAPHITE OR CERAMIC GRANULES, IN PARTICULAR FOR PRODUCING GRAPHITE TUBES

BACKGROUND OF THE INVENTION

Field of the Invention

The invention relates to a process and a device for producing components and semi-finished products from synthetic graphite or ceramic granules, in particular for producing graphite tubes or a component or semi-finished product made of synthetic graphite or ceramic granules.

Graphite has very good electrical and thermal conductivity and has a very high level of chemical and thermal resistance. For this reason the material graphite is used, in the form of tubes for example, as a semi-finished product for chemical apparatuses. Tubular heat exchangers made from bundled graphite tubes therefore are known for example.

As graphite is a ceramic material, one of the minor advantageous characteristics of this material is a relatively low resistance to impulsive and dynamic loads, in particular, in order to improve the dynamic resistance of graphite tubes, it was proposed in accordance with DE 31 16 309 C2 to cover the tubes with carbon fibres, the connection with interlocking fit between the tube and the bundles of fibres being produced by means of a curable resin, in a manner similar to a laminate. This process is, however, relatively complex and therefore cost intensive.

In accordance with a known process for producing components and semi-finished products from graphite, petroleum coke or graphite granules, for example, are used, as raw materials which are comminuted and screened in a first step. Subsequently, the bulk starting material which has been comminuted is mixed with a binding agent to form a viscous material to be mixed. For the shaping of the material to be mixed which is obtained in such a manner and is ready for pressing, for example to form a tube, this is fed into the supply chamber of an extrusion press and then compressed by means of a plunger piston which can be moved longitudinally in a press housing in the direction of an outlet opening and is pressed out as a virtually continuous strand, for example in the form of a tube. A screw-type extruder which is coaxial to the press housing can also assume the pressing out of the material instead of a plunger piston.

As a result of the forward movement of the plunger piston and the relatively good flowability of the material to be mixed, the predominantly elongate-shaped coke or graphite particles are aligned from the start in the case of extrusion pressing or extrusion so as to be parallel to the direction of pressing in the flow field pointing towards the outlet opening and remain "frozen" in this position in the subsequent production stages. As the main direction of thermal conduction runs primarily along the alignment of the material particles, the material properties of components pressed in such a way consequently have strong anisotropies, i.e. whilst the thermal conductivity of an extrusion pressed heat exchanger graphite tube has high values owing to the predominant particle alignment parallel to the direction of pressing in axial longitudinal direction, it is disadvantageously low, however, in the radial direction which is important for heat transference in heat exchanger tubes. On the other hand, the alignment of the particles in the axial longitudinal direction has a favourable effect on the bending and tensile strength of the graphite components which is particularly advantageous in heat exchange tubes.

Conventional extrusion presses have a plunger piston which can be moved longitudinally inside a press housing, which plunger piston delimits a supply chamber which discharges into an outlet opening of a shaping mouthpiece of the press housing narrowing in the shape of a funnel in the direction of pressing, which funnel can be filled with material to be pressed and can be comminuted by its pressing movement. Once the material to be pressed has been pressed out of the outlet opening, the plunger piston must be withdrawn completely from the press housing so the supply chamber can be refilled with material to be pressed. It goes without saying that the refilling process is complex and therefore the piston stroke and the supply chamber of such extrusion presses must be designed as large as possible for reasons of economy, in order to avoid frequent refilling. Accordingly, the pressed part located in the supply chamber is relatively long, whereby the forward movement forces required to compress and press out the pressed part from the constricted outlet opening are high. In order to limit the pressing forces, the bulk material is accordingly free-flowing. Upon pressing out, a flow field is produced inside the supply chamber, in which flow field the graphite particles tend to align themselves parallel to the direction of pressing which, in tubes, in turn results in the already described undesired anisotropy of the graphite material.

SUMMARY OF THE INVENTION

Accordingly, the object of the present invention is to create a process and a device for producing components and semi-finished products from synthetic graphite or ceramic granules as a result of which the anisotropies present in the graphite material are reduced without the strength of the material being reduced.

ADVANTAGES OF THE INVENTION

The process according to the invention in accordance with claim 1 has the advantage that owing to the pre-pressing process, as in the case of stamping presses, the graphite particles initially align themselves within the pre-compressed material block transversely to the direction of pressing. Owing to the low flowability of the material to be mixed in the region of the constricted outlet opening of the extrusion press or the extruder upon pressing out, the graphite particles rotate out of their original transverse alignment only by a small angle in the direction of pressing, so that they are arranged substantially obliquely or spirally in relation to the central axis of the finished component.

As the predominant direction of the thermal conduction and resistance properties defined by the alignment of the particles is now no longer purely transverse or purely parallel to the central axis of the pressed component but rather is oblique thereto, a new type of graphite material with substantially lower anisotropy than before results. This is because, on the one hand the obliquely oriented particles have a component transverse to the direction of pressing, which, for example, is favourable for the radial thermal conductivity of heat exchanger graphite tubes produced according to the process according to the invention. On the other hand, the components of the particles complementary thereto which point in the direction of pressing prevent the bending strength of the graphite tubes being significantly reduced.

An embodiment of the invention which is particularly preferred provides for the extrusion press to have a supply chamber with a supply opening for supplying material to be mixed, which supply opening is arranged between a start and an end position of a plunger piston which can be reduced to the size of the supply chamber, the shaping of the material to be mixed comprising the following steps which form a cycle:

a) Metering of material to be mixed into the supply chamber with the aid of a metering device until this is completely filled when the plunger piston is in the starting position, b) Quasi-static pre-pressing of the material to be mixed in the supply chamber by slow forward movement of the plunger piston in order to align the particles transversely to the direction of pressing, c) Pressing out of a volume of pre-compressed material to be mixed through the outlet opening, which volume is smaller than the volume originally in the supply chamber, whereby, once the end position of the plunger piston in the supply chamber has been reached, a pre-compressed residual volume remains, d) Return of the plunger piston to the starting position and metering of new material to be mixed into an intermediate chamber between the pre-compressed residual volume and the plunger piston until the supply chamber is again filled completely, e) Continue with step b).

Owing to the rapid and quasi-continuous refilling potential by means of the supply opening, small quantities of material to be pressed can also be pressed economically by a single pressing stroke. High pressing forces are therefore no longer necessary, so the flowability of the material to be mixed can be reduced in a concerted manner. Owing to the internal flow hindrance of the material to be pressed no pronounced flow field can form in which the graphite or granular particles could align parallel to the direction of flow. Rather, as already described above, the material to be pressed is pre-pressed almost statically, whereby the graphite particles align transversely to the direction of pressing before the material to be pressed leaves the supply chamber through the outlet opening. Owing to the inner flow hindrance of the pre-pressed bulk material it is advantageously obliquely aligned when it flows through the constricted outlet opening.

In accordance with a further embodiment, it is provided that the alignment of the particles transversely to the direction of pressing required at the start is brought about by pre-compressing the material to be mixed to form a block-shaped pre-pressed part, preferably by means of a stamping press and the pre-pressed part is then placed in a supply chamber of a piston extruder in order to then press it through the outlet opening to give it its shape.

Further particularly preferred measures provide that the material to be mixed is obtained by mixing a bulk starting material containing at least one particle size fraction of petroleum coke and/or graphite granules with a binding agent and additionally adding carbon fibres to the material to be mixed. By adding carbon fibres the resistance of the graphite components can be increased in an advantageous manner.

An addition of commercially available auxiliary pressing agents supports the desired internal flow hindrance of the bulk material to the extent that the wall friction of the bulk material with the cylinder wall in particular is reduced and therefore a stopper flow is produced which hinders the alignment of the particles in the direction of pressing.

The binding agents used in the production of graphite components have the object of connecting the solids particles to one another by means of high wetting ability and therefore of making them plastically deformable as well as ensuring the required resistance of the components. The binding agent is conventionally added, for example, in liquid form, to the solids consisting of petroleum coke or graphite granules. The quantity of binding agent is metered at such a high rate in the state of the art that a relatively low impact pressure is produced inside the supply chamber of the extrusion press. A material to be mixed having the conventionally high proportion of binding agent has the disadvantage, however, that owing to the good flowability of the bulk material the particles are aligned in the direction of pressing particularly well and in this way the formation of a strongly anisotropic pressing part is supported. Furthermore, the material shrinks greatly during subsequent pyrolysis. The severe shrinkage furthermore has an unfavourable effect on the strengthening effect of the carbon fibres introduced.

Accordingly, in accordance with a development of the invention the material proportion of the added binding agent is low and is between 5 and 32 wt. % of the total mass of the material to be mixed. This has the advantage that the material to be mixed shrinks less during the subsequent pyrolysis on the one hand, and, on the other hand, is less flowable, so the desired flow hindrance of the material to be mixed is effectively supported by a lower proportion of liquid binding agent and the tendency of the graphite particles to align themselves parallel to the direction of flow, is reduced. During later pyrolysis, the situation where the carbon fibres present in the component resulting from the material to be mixed become ineffectual owing to shrinkage is additionally effectively prevented.

A further development of the process according to the invention provides that the bulk starting material and the binding agent and further raw materials to form the material to be mixed are mixed by a mixer with low shearing effect, for example a tumble mixer or a Rhön wheel mixer.

The result is a particularly gentle mixing process, shearing or breaking off of the carbon fibres added to increase the component resistance being avoided in particular. Furthermore, the individual components are mixed particularly thoroughly with the aid of tumble mixers, so no undesired accumulations of carbon staple fibres form.

Finally, in accordance with one development of the process it is provided that the bulk starting material is comminuted and screened before mixing in such a way that it effectively contains a first particle size fraction with particle sizes greater than 0 mm and less than 60 $\mu$m and with a material proportion of 20 to 100 wt. % of the bulk starting material, and a second particle size fraction with particle sizes of 60 $\mu$m to 750 $\mu$m and a material proportion of 0 wt. % to 34 wt. % of the bulk starting material and a third particle size fraction with particle sizes greater than 750 $\mu$m to 2,000 $\mu$m and a material proportion of 0 wt. % to 46 wt. % of the bulk starting material. By producing a bulk starting material containing coarser particles, the material to be mixed resulting therefrom is less viscous and consequently a higher level of internal friction is produced during the subsequent pressing process which prevents a rapid discharge of the material to be mixed through the outlet opening of the extrusion press. As a result, the desired pre-compression of the material to be mixed is supported effectively.

The device has the advantage that owing to the rapid and quasi-continuous refilling potential of the extrusion press by means of the supply opening, smaller quantities of material to be pressed can also be pressed economically with a single piston stroke and consequently pressing can be carried out with forces which are lower compared with the state of the art. An increase in the flowability of the material to be mixed in order to limit the pressing forces is therefore no longer necessary. Rather, in contrast, the flowability of the material to be mixed can be reduced in a concerted manner in order to prevent the formation of a pronounced flow field in which the graphite particles could align in an undesired manner parallel to the direction of flow. Furthermore, the desired particle alignment can be best achieved with a ratio D/d of the diameter D of the supply chamber to the diameter d of the outlet opening smaller than or equal to 2.5, preferably in a range from 0.4 to 1.0.

Conventional extrusion presses extend in vertical direction in order to be able to uniformly fill the supply chamber from above with material to be mixed after removal of the plunger piston. In order to be able to press out continuous components, for example tubes, the height of such vertical extrusion presses must, however, be appropriately large.

In contrast, a preferred development of the device provides for the longitudinal extent of the extrusion press is arranged substantially parallel to the horizontal and the supply opening of the supply chamber to be arranged substantially transversely thereto. Owing to the horizontal arrangement of the extrusion press, its height is advantageously slight and continuous components of almost any length can be pressed out. On the other hand, the filling of the supply chamber in the vertical direction ensures that the material to be mixed is uniformly distributed there.

BRIEF DESCRIPTION OF THE DRAWINGS

Embodiments of the invention are described in more detail in the description below and illustrated in the drawings, in which.

DESCRIPTION OF THE PREFERRED EMBODIMENTS

Figure 1:
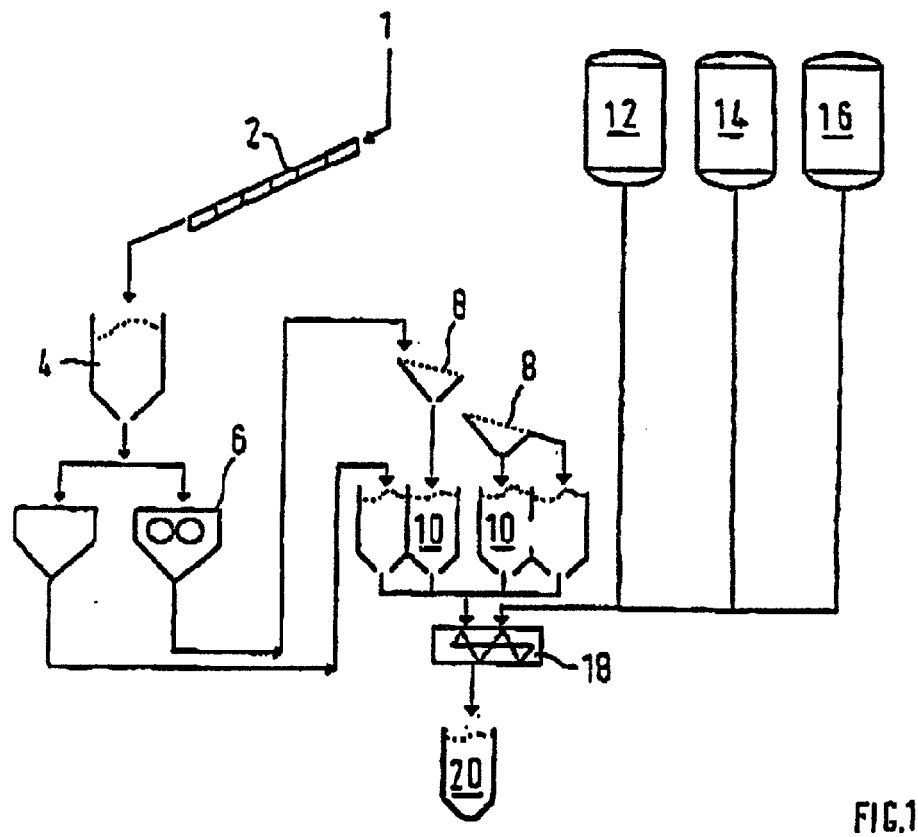
FIG. 1 shows a flow diagram of a part of the production process of graphite components.

The flow diagram in accordance with FIG. 1 shows the first production stages of the process according to the invention for producing components and semi-finished goods from graphite or ceramic granules, with graphite tubes for use in heat exchangers having been produced in accordance with a preferred embodiment. Numerous production attempts with various raw materials and production stages were carried out for this purpose, of which only some are described below by way of example.

Petroleum coke, for example, was used as bulk starting material which was initially calcined, i.e. was calcined at 1,200 to 1,400° C. in a rotating tubular kiln or revolving hearth furnace 2, for example, and was then temporarily stored in a silo 4. In a subsequent stage, the bulk starting material was comminuted by rotary crushers 6 or impact grinding mills, for example, and screened in sieves a in such a way that fractions of different particle sizes resulted which were temporarily stored in bins 10 which were separate from one another.

The granulometry of petroleum coke and graphite granules which have been comminuted and screened is listed in Table 1 below with the aid of three test examples in each case and the particle sizes are classified in four ranges, in each case 0–60 $\mu$m, 60–200 $\mu$m, 200–400 $\mu$m and 400–750 m. In accordance with a first embodiment in which petroleum coke serves exclusively as bulk starting material, the largest particles had a diameter between 400 Fm and 750 $\mu$m, wherein 45 wt. % of the material proportion were smaller than 60 M and 55 wt. % material proportion of the bulk starting material were greater than/equal to 60 $\mu$m. Petroleum coke was also used as raw material in a second embodiment in which the largest particles were somewhat smaller than 400 $\mu$m and the material proportion of particles smaller than 60 $\mu$m was 44 wt. % and that of particles greater than/equal to 60 $\mu$m was 56 wt. %. Finally, when using graphite granules as starting material the largest particles reached a size of 750 $\mu$m, with the material proportion of particles greater than/equal to 60 $\mu$m being 45 wt. % and the fraction of particles smaller than 60 $\mu$m being 56 wt. %.

TABLE 1

Granulometry of the bulk starting materials by way of example

| Fraction [$\mu$m] | 0–60 | 60–200 | 200–400 | 400–750 |
|---|---|---|---|---|
| Petroleum coke, Material proportion [wt. %] | 45 | 21 | 14 | 20 |
| Petroleum coke, Material proportion [wt. %] | 44 | 32 | 24 | 0 |
| Graphite granules, Material proportion [wt. %] | 55 | 17 | 18 | 10 |

In Table 2 below the minimum possible particle sizes determined in the course of the tests are denoted by "A" and the maximum possible particle sizes are denoted by "B", these being particles with which a still sufficient component resistance could be achieved and a shaping of the graphite material was still just possible. Therefore, the particle size fractions between 0 and 60 $\mu$m in the smallest possible grain size A together occupied 100 wt. % of material proportion of the bulk starting material, grain sizes coarser than 60 $\mu$m not occurring on the other hand. In contrast, a substantially wider band of 0 to 2,000 $\mu$m resulted with the largest possible grain size B, the finest fractions between 0 and 60 $\mu$m together making up 20 wt. % of the material proportion, the medium-sized fractions of 60 $\mu$m to 750 $\mu$m together making up 34 wt. % of the material proportion and the coarsest fractions between 750 $\mu$m and 2,000 $\mu$m together making up 46 wt. % of the material proportion of the bulk starting material.

TABLE 2

Maximum and minimum granulometry of the bulk starting material

| Fraction [$\mu$m] | 0–10 | 10–40 | 40–60 | 60–200 | 200–400 | 400–750 | 750–1000 | 1000–2000 |
|---|---|---|---|---|---|---|---|---|
| A fractions (wt. %) | 60 | 40 | 0 | 0 | 0 | 0 | 0 | 0 |
| B fractions (wt. %) | 3 | 10 | 7 | 15 | 10 | 9 | 21 | 25 |

As emerges from Table 3 and FIG. 1 the petroleum coke or the graphite granules 1 were mixed following their reduction in size and screening with a binding agent 12, for example phenolic resin, Novolak®, type SP 222, flow paths 20–100 mm, the binding agent being finely ground with an addition of a % hexamethylene tetramine (Hexa), produced by Bakelite AG, Germany or pitch of the BX 95 type, SP>30° C., produced by Rutgers, Germany. In addition, sized carbon staple fibres 14, preferably SIGRAFIL® fibres of the type C-25-S006 EPY produced by SGL Technik GmbH, Germany were added to the bulk starting material in some tests, which fibres have a diameter of 8 μm and a length of 6 mm. Finally, an auxiliary pressing agent 16, for example in the form of paraffin oil with a viscosity of 60 mPa·s at 20° C. or in the form of Stearin®, laboratory product "stearic acid", was additionally added in some of the tests to reduce the wall friction. Mixing took place with a slow-running Rhön wheel mixer 18 with mixing baffles in the form of perforated plate crosses at room temperature or with a two-armed mixer at a temperature of 80° C., whereby a material to be mixed 20 which is ready for pressing is obtained as a result.

Furthermore, Table 3 shows the material proportions of the raw material of the material 20 to be mixed as were used in the tests. Accordingly, the material proportion of the bulk starting material consisting of the various particle size fractions was between 65 and 95 wt. % and the material proportion of the binding agent was between 5 and 32 wt. % of the total mass of the material 20 to be mixed. In so far as carbon staple fibres 14 were added, their material proportion was 0 to 15 wt. %, in the case of the auxiliary pressing agent 16, 0 to 5 wt. %.

Figure 2:
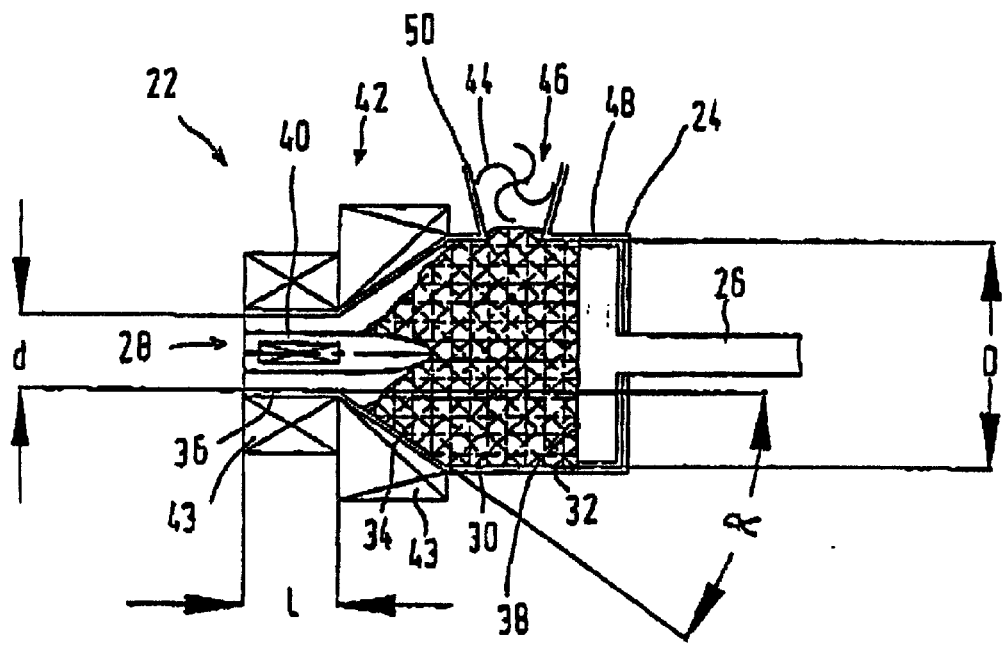
FIG. 2 shows a schematic sectional view through an extrusion press according to the invention for pressing material to be mixed in a preferred embodiment with completely filled supply chamber.

The material 20 to be mixed was shaped by an extrusion press 22 illustrated in cross-section in FIG. 2 with a plunger piston 26 which can be moved in the longitudinal direction inside a press housing 24, which plunger piston delimits a supply chamber 30 which discharges into an outlet opening 28 of the press housing 24 which is constricted in contrast, which supply chamber can be filled with material to be pressed and can be comminuted by its pressing movement. The longitudinal extent of the extrusion press 22 is substantially parallel to the horizontal.

The press housing 24 comprises a cylindrical portion 32 with diameter D guiding the plunger piston 26 and a funnel-shaped portion 34 which is provided, for example, at its end with a tubular mouthpiece 36 with diameter d forming the outlet opening 28.

TABLE 3

Type and material proportions of the components of the material to be mixed

| Raw material | Property | Range |
|---|---|---|
| Petroleum coke/ graphite granules | Granulometry Quantity | Maximum particle size 0.04 to 2 mm 65–95 wt. % |
| Binding agent | Type | Pitch, SP > 30° C. Phenolic resin, Phenolic resin-Novolaks flow path 20–100 mm |
| | Quantity | 5–32 wt. % |
| Carbon fibres | Fibre lengths Pre-treatment | 0.2–15 mm sized, sizings suitable for incorporating in pitch and/or phenolic resins |
| | Quantity | 0–15 wt. % |
| Auxiliary pressing agent | Type Quantity | Paraffin oil, Stearin ® 0–5 wt. % |

The supply chamber 30 is essentially formed by a space enclosed by the cylindrical and funnel-shaped section 32, 34 and delimited by a pressing face 38 of the plunger piston 26 pointing towards the outlet opening 28 and is at its largest when the plunger piston 26 is in a starting position illustrated in FIG. 2 which is as far from the outlet opening 28 as possible.

A counter mandrel 40 is coaxially received inside the tubular mouthpiece 36 at a radial distance to the latter's inner peripheral face to form the tube, which counter mandrel projects at least partially into the cylindrical portion 32 of the press housing 24 with its end facing towards the plunger piston 26 and tapers there. The funnel-shaped portion 34, the tubular mouthpiece 36 and the counter mandrel 40 together form a shaping mouthpiece 42 of the extrusion press 22. The shaping mouthpiece 42 is connected in a heat conducting manner to heating devices 43 to heat material to be mixed which has been pressed through the shaping mouthpiece 42, the heating device 43 of the tubular mouthpiece 36 being heat insulated from the heating device of the funnel-shaped portion 34.

The ratio D/d of the diameter D of the cylindrical portion 32 of the press housing 24 to the diameter d of the tubular mouthpiece 36 is smaller than or equal to 2.5 The ratio of the diameter d of the tubular mouthpiece 36 to its length 1 is preferably smaller than or equal to 1 and the funnel-shaped portion 32 has a cone angle α of 35°.

The supply chamber 30 has a separate supply opening 46 connected to a metering device 44, via which supply opening material to be pressed can be supplied in metered fashion to the supply chamber. The supply opening 46 is designed as a through hole in a wall 48 of the cylindrical portion 32 of the press housing 24 transversely to the horizontal longitudinal extension of the extrusion press 22 and is extended radially outwards by a funnel-shaped filling tube 50 in which a cellular wheel sluice 44 forming the metering device is received.

Figure 3:
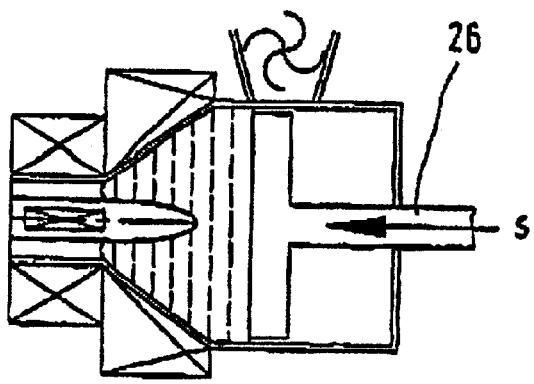
FIG. 3 shows the extrusion press of FIG. 2 during pre-compression.

The individual stages illustrated schematically in FIG. 2 to FIG. 5 which form a pressing procedure are now to be described below. Initially, the plunger piston 26 is in a starting position in accordance with FIG. 2 which is as far away from the outlet opening 28 as possible, so the supply chamber 30 assumes its maximum size. In a first stage, material to be mixed with irregularly aligned particles is metered into the supply chamber 30 via the cellular wheel sluice 44 until the supply chamber is completely filled. Then the metered material to be mixed is compressed by forward movement of the plunger piston 26, for example at a continuous forward movement speed s of a maximum of 4 m/min, as shown in FIG. 3. Owing to the high proportion of coarse-grained fractions of the graphite granules or petroleum coke which has been comminuted, which bring about a relatively high level of inner friction in the material to be pressed, discharging of the material to be mixed through the constricted outlet opening is initially prevented. Consequently a quasi-static compression results for which reason the previously irregularly aligned particles in the material to be mixed, for example carbon fibres and graphite particles can, similarly to when pressing in a stamping press, only align transversely to the direction of forward movement or pressing.

Figure 4:
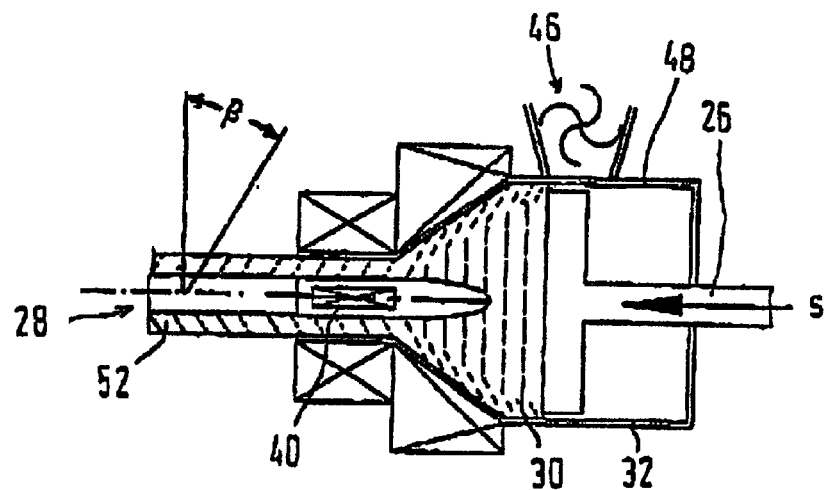
FIG. 4 shows the extrusion press of FIG. 2 during extrusion.

As the plunger piston 26 moves with a, for example, continuous forward movement speed towards the outlet opening 28, after a certain period of time, the situation illustrated in FIG. 4 results in which it has reached its end position and pre-compressed material to be mixed discharges through the outlet opening 29, passing the counter mandrel 40, whereby it is shaped into a continuous tube 52.

Owing to the internal flow hindrance, the particles previously aligned transversely to the direction of pressing, realign inside the material to be mixed in such a way that they assume a slightly altered oblique position and now exhibit a direction component in the direction of pressing based on their longitudinal extent. Oblique position should be understood here to mean an angular alignment $\beta$ greater than 0° and smaller than/equal to 75° to a plane perpendicular to the longitudinal axis of the tube.

In order to achieve sufficient thermal conductivity of the graphite tubes 52 in radial direction, a too severe alignment of the particles in the direction of the longitudinal axis is unfavourable. Care is expediently to be taken that the external friction acting on the pre-compressed material to be mixed is as low as possible, the internal friction on the other hand being as high as possible, for example by addition of the auxiliary pressing agent 16. The aim is the formation of a stopper flow in the interior of the supply chamber 30.

The supply opening 46 is preferably arranged between the starting position and the end position of the plunger piston 26, so that, in its end position in accordance with FIG. 4, it has at least partially passed the supply opening 46 and is in the region of the end of the cylindrical portion 32 of the press housing 24, whereby the supply chamber 30 is disconnected from the supply opening 46. The piston stroke is preferably dimensioned such that a volume of pressed material to be mixed is pressed out of the outlet opening 26 which is smaller than the volume of material to be mixed originally metered into the supply chamber 30, so a residual volume of material to be mixed which has been pressed into the funnel-shaped portion 34 of the press housing 24 remains in the supply chamber 30.

Figure 5:
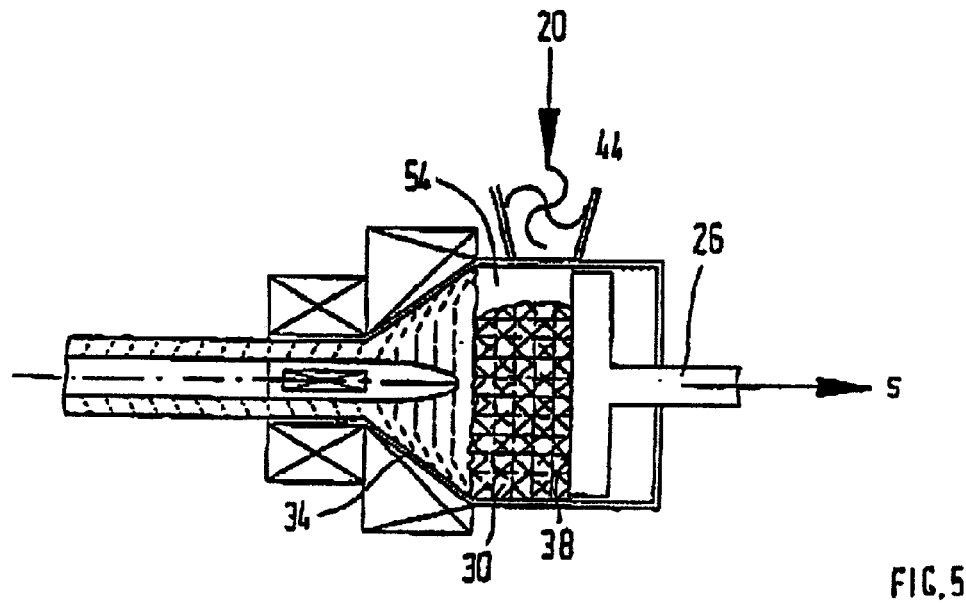
FIG. 5 shows the extrusion press of FIG. 2 during the refilling process.

Finally, the plunger piston 26 is rapidly returned to its starting position, whereby the supply opening 46 is completely exposed, as shown with the aid of FIG. 5. The intermediate space 54, which has now been produced between the residual volume of the material to be mixed remaining in the funnel-shaped portion 34 and the pressing face 38 of the plunger piston 26 pointing towards the outlet opening 28, is now filled with new material 20 to be mixed by means of the metering device 44 until the supply chamber 30 is again completely filled. As the remaining volume of the material to be mixed of the previous pressing procedure has already been pre-compressed in the funnel-shaped portion 34, a discharge barrier is formed for the newly filled volume of material to be mixed against which the plunger piston 26 now presses from the other side. Therefore, the newly filled, still slightly compressed volume of material to be mixed is compressed by the advancing piston movement, so the particles can align transversely before the residual volume of the previous pressing procedure remaining in the funnel-shaped portion 34 and constituting a stopper is pressed out. After the plunger piston 26 has reached its end position the cycle described starts from the beginning again.

Figure 6:
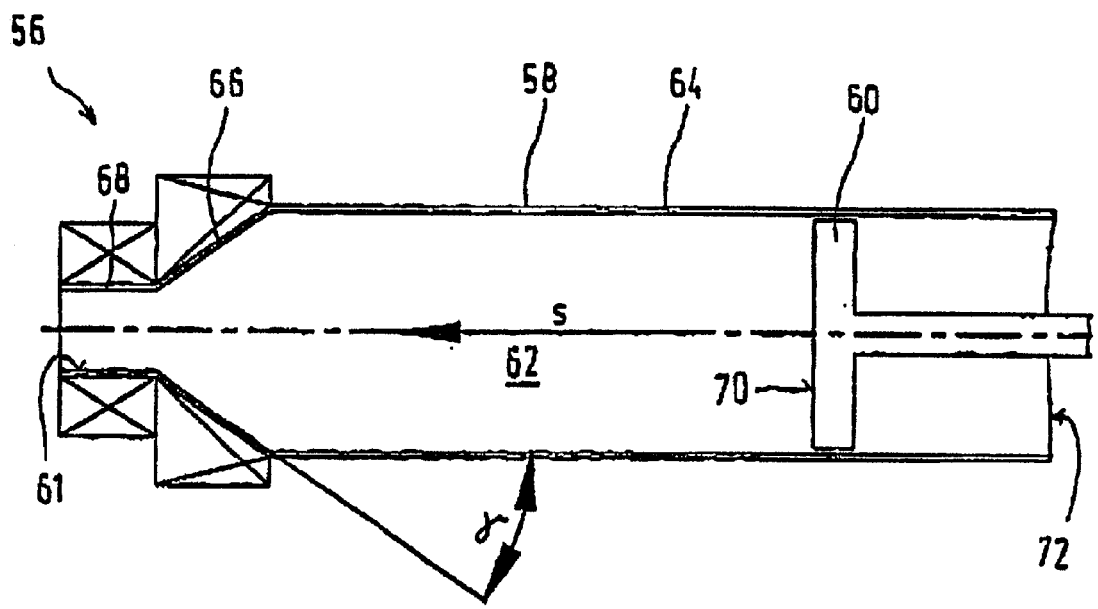
FIG. 6 shows a piston extruder for shaping the material to be mixed.

In addition to the above-described extrusion press 22, also used for shaping material to be mixed was a piston extruder 56 illustrated in FIG. 6 with a plunger piston 60 which can be moved longitudinally inside an extruder housing 58, which piston delimits a supply chamber 62 which discharges into an outlet opening 61 which is constricted on the opposite side and which supply chamber can be filled with material to be pressed and can be comminuted by its pressing movement. The extruder housing 58 comprises a cylindrical portion 64 guiding the plunger piston 60 and a funnel-shaped portion 66 with a cone angle $\gamma$ of preferably 30°, which is provided at its end with a tube stump 68 forming the outlet opening 61, the supply chamber 62 being substantially formed by the inner space enclosed by the cylindrical and funnel-shaped section 64, 66 and delimited by a pressing face 70 of the plunger piston 60 pointing towards the outlet opening 61. In contrast to the previously described extrusion press 22, the supply chamber 62 is substantially longer, so greater forces are necessary for pressing and the forward movement speed s is likewise higher.

In the tests in which the piston extruder 56 was used, the material to be mixed was initially statically pre-compressed in a stamping press known per se (not shown) in order to achieve an alignment of the graphite particles and carbon fibres transverse to the direction of pressing. Subsequently, the pre-compressed pre-pressed part adapted to the size of the supply chamber 62 of the piston extruder 56 was introduced into the supply chamber by withdrawing the plunger piston 60 counter to the direction of pressing through an end rear aperture 72 coaxial with the piston axis and then passing the pre-pressed part through the same aperture and placed in the supply chamber 62. The particles were realigned into an oblique position as in the previously described extrusion press 22 by the subsequent forward movement of the piston and the resulting pressing out of material to be mixed through the outlet opening 61.

Figure 7:
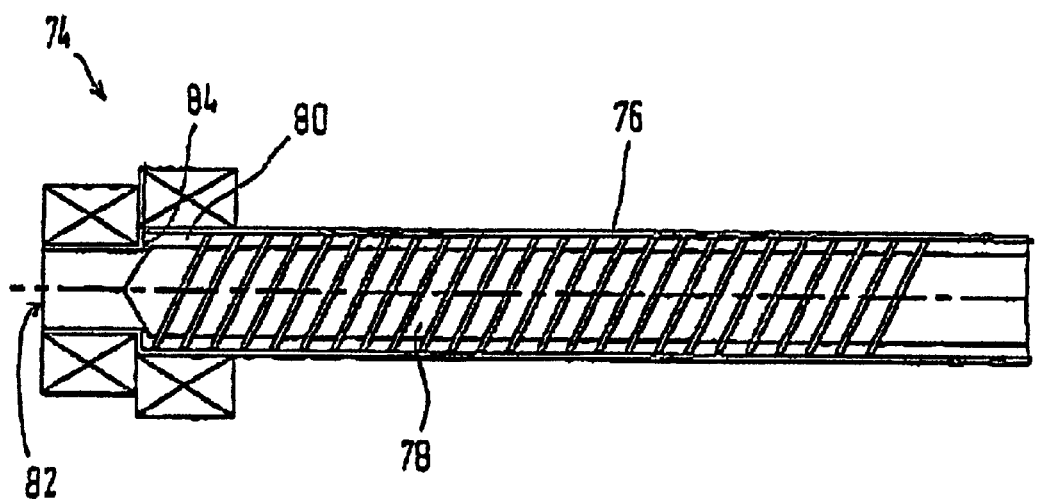
FIG. 7 shows a single-screw-type extruder for shaping the material to be mixed.

FIG. 7 shows a single-screw-type extruder 74 as was used to shape the material to be mixed in some of the tests. Instead of a plunger piston the single-screw-type extruder 74 has a coaxially rotating pressure worm 78 inside an extruder housing 76.

Table 4 gives an overview of the parameters used and attained in 17 tests to produce graphite tubes. In the test denoted by the serial number 8, for example, a material to be mixed, the total material of which consisted of 87 wt. % graphite with a maximum particle size of 0.75 mm and 10 wt. % of binding agent in the form of Novolak, 1 wt. % paraffin oil and 2 wt. % carbon fibres of 6 mm in length was pressed to form a graphite tube in accordance with the process illustrated in FIG. 2 to FIG. 5. The metered individual components were mixed at room temperature to form a material to be mixed with the Rhön wheel mixer 18 (FIG. 1). The relative flowability of the material to be mixed was 0.38. After shaping by means of the extrusion press 22, the graphite tube was fired (coked) in an electrically heated kiln with protective furnace gas rinsing (nitrogen) to 800° C.

The result of Test No. 8 were graphite tubes with a thermal conductivity of 84 W/(m×K) in the direction of pressing or length of the tube and 81 W/(m×K) transversely to the direction of pressing or length of the tube, a ratio of thermal conductivities along transverse to the direction of pressing of 1.04 being produced. The angle between the carbon fibres and the direction of pressing or length of the tube was approximately 85°, i.e. the initially transversely aligned particles (corresponding to 90°) were realigned by approximately 5° in the direction of pressing. The bursting pressure of the graphite tube amounted to 68 bar.

TABLE 4

| | Test parameters | | | | |
|---|---|---|---|---|---|
| | Raw materials Quantity in [wt. %] | | | | |
| Serial No. | Coke, graphite | Pitch | Novolak | Pressing aid | c-fibre |
| | Shaping by extrusion press | | | | |
| | Graphite <0.75 mm | S.P. 110° C. | Fine powder + 8% Hexa | | Length 6 mm |
| | | | | Paraffin oil | |
| 1 | 78 | — | 20 | — | 2 |
| 2 | 80 | — | 18 | — | 2 |
| 3 | 80 | — | 18 | — | 2 |
| 4 | 84 | — | 14 | — | 2 |
| | | | | Stearin | |
| 5 | 87 | — | 12 | 1 | — |
| 6 | 85 | — | 12 | 1 | 2 |
| 7 | 87 | — | 10 | 1 | 2 |
| 8 | 87 | — | 10 | 1 | 2 |
| | Shaping by piston extruder | | | | |
| | | S.P. 110° C. | Fine powder + 8% Hexa | Paraffin oil | Length 6 mm |
| | Graphite <0.75 mm | | | | |
| 9 | 80 | — | 18 | 2 | — |
| 10 | 80 | — | 18 | 2 | — |
| 11 | 78 | — | 18 | 2 | 2 |
| 12 | 82 | — | 15 | 1 | 2 |
| | Shaping by screw-type extruder with conical mouthpiece | | | | |
| | Graphite <0.75 mm | | | | |
| 13 | 75 | — | 25 | — | — |
| | Shaping by screw-type extruder with stepped mouthpiece | | | | |
| | | S.P. 110° C. | Fine powder + 8% Hexa | Paraffin oil | Length 6 mm |
| | Petroleum coke <0.79 mm | | | | |
| 14 | 70 | 30 | — | — | — |
| 15 | 68 | 30 | — | — | — |
| | Petroleum coke <0.4 mm | | | | |
| 16 | 69 | 31 | — | — | — |
| 17 | 67 | 30 | — | 1 | 2 |

| Serial No. | Relative flowability of the material to be mixed | Carbonisation | Graphitisation | Thermal conductivity [W/(m × k)] | | | C-fibre alignment [°] | Bursting pressure [bar] |
|---|---|---|---|---|---|---|---|---|
| | | | | in direction of pressing | transversely to the direction of pressing | Ratio along/ transversely | | |
| | Shaping by extrusion press | | | | | | | |
| 1 | 0.95 | yes | no | 60 | 40 | 1.5 | approx. 60 | 41 |
| 2 | 0.98 | yes | no | 55 | 42 | 1.3 | approx. 60 | — |
| 3 | 0.98 | yes | yes | 58 | 52 | 1.1 | approx. 60 | — |
| 4 | 0.75 | yes | yes | 67 | 61 | 1.1 | approx. 75 | 45 |
| 5 | 0.54 | yes | no | 62 | 59 | 1.05 | — | 49 |
| 6 | 0.52 | yes | no | 64 | 62 | 1.03 | approx. 80 | 66 |
| 7 | 0.38 | yes | no | 67 | 65 | 1.03 | approx. 85 | 70 |
| 8 | 0.38 | yes | yes | 84 | 81 | 1.04 | approx. 85 | 68 |

TABLE 4-continued

Test parameters

Shaping by piston extruder

| 9 | 0.72 | yes | no | 51 | 41 | 1.2 | — | 54 |
| 10 | 0.72 | yes | yes | 56 | 51 | 1.1 | — | — |
| 11 | 0.68 | yes | yes | 62 | 58 | 1.07 | approx. 75 | 56 |
| 12 | 0.45 | yes | yes | 65 | 64 | 1.02 | approx. 80 | 65 |

Shaping by screw-type extruder with conical mouthpiece

| 13 | 2.0 | yes | yes | 60 | 25 | 2.4 | — | 40 |

Shaping by screw-type extruder with stepped mouthpiece

| 14 | 3.0 | yes | yes | 110 | 90 | 1.22 | — | 41 |
| 15 | 2.4 | yes | yes | 98 | 69 | 1.42 | approx. 30 | 57 |
| 16 | 2.8 | yes | yes | 120 | 90 | 1.33 | — | — |
| 17 | 2.7 | yes | yes | 110 | 95 | 1.16 | approx. 30 | 53 |

For the purpose of comparison, a reference test is denoted by the number 13 in which shaping is by means of a screw-type extruder in accordance with the state of the art with a 30° conical shaping mouthpiece. No carbon fibres are added to the material to be mixed. As emerges from the table, graphite tubes are produced in which the thermal conductivity in the direction of the length of the tube was 2.4 times the thermal conductivity transverse to the direction of the length of the tube—a considerably higher pronounced material anisotropy therefore compared with Test No. 8 with a ratio along/transverse of 1.04.

In contrast, the screw-type extruder 74 in accordance with FIG. 7, with stepped instead of conical shaping mouthpiece was used to press the material to be mixed in the course of Test No. 14. As a result, a substantially more favourable ratio of thermal conductivity along/transverse to the direction of pressing of 1.22 could be achieved.

An advantageously balanced thermal conductivity ratio of 1.02 was also achieved with Test No. 12 in which the material to be mixed had a relative flowability of 0.45 and shaping was by means of the piston extruder 56 in accordance with FIG. 6, the material to be mixed having been pre-compressed in a stamping press. The binding agent fraction of the material (Novolak) to be mixed was low at 15 wt. %, in addition, 2 wt. % of carbon fibres and 1 wt. % of auxiliary pressing agent were added. An angle of approximately 80° was produced between the carbon fibres embedded in the graphite material and the direction of the length of the tube, i.e. the particles initially aligned transversely owing to the block compression in the stamping press (corresponding to 90°) were realigned by 10° in the direction of pressing. In addition, at 65 bar the bursting pressure was substantially higher than in the state of the art (Test No. 13).

The parameters of the further tests can be inferred from the table, whereby, to sum up, it can be stated that the typically pronounced anisotropy for the graphite materials of the state of the art could be significantly reduced by using the process according to the invention. As a result, graphite components were produced with substantially higher thermal conductivity transversely to the direction of pressing, and as a result of the addition of carbon fibres to the material to be mixed, graphite tubes with higher bursting pressures could moreover be produced.

We claim:

1. Process for producing components and semi-finished products from synthetic graphite or from ceramic granules, in particular for producing graphite tubes (52), involving shaping of a material to be mixed (20) preferably containing petroleum coke or graphite granules, by means of an extrusion press (22) or an extruder (56; 74), characterized by the following steps;
  a) Pre-pressing the material to be mixed (20) in static or quasi-static manner, flow movements of the material to be mixed (20) being stopped or impeded in such a way that particles previously irregularly arranged in the material to be mixed are initially aligned transversely to the direction of pressing,
  b) Pressing out of the pre-pressed material to be mixed (20) through an outlet opening (28; 61; 82) of the extrusion press (22) or the extruder (56; 74) in such a way that owing to adjusted flow properties of the material (20) to be mixed, the particles within the pre-compressed material (20) to be mixed realign, starting from their transverse alignment, by an angle (β) of a maximum of 75° in the direction of pressing.

2. Process according to claim 1, characterised in that the material (20) to be mixed is preferably pre-pressed statically to form a block-shaped pre-pressed part by means of a stamping press and the pre-pressed part is then placed in a supply chamber (62) of a piston extruder (56) in order to press it through the outlet opening (61) to give it its shape.

3. Process according to claim 1, characterised in that the extrusion press (22) has a supply chamber (30) with a supply opening (46) for supplying material (20) to be mixed, which supply opening is arranged between a start and an end position of a plunger piston (26) which can be used to reduce the size of the supply chamber (30), the shaping of the material to be mixed (20) comprising the following steps which form a cycle:
  f) Metering of material to be mixed into the supply chamber (30) with the aid of a metering device (44) until it is completely filled when the plunger piston (26) is in the starting position,
  g) Quasi-static pre-pressing of the material to be mixed in the supply chamber (30) by slow forward movement of the plunger piston (26) in order to align the particles transversely to the direction of pressing,
  h) Pressing out of a volume of pre-compressed material to be mixed through the outlet opening (28), which volume is smaller than the volume originally in the supply chamber (30), whereby once the end position of the plunger piston (26) in the supply chamber (30) has been reached a pre-compressed residual volume remains,
  i) Return of the plunger piston (26) to the starting position and metering of new material to be mixed into an intermediate chamber (54) between the pre-compressed residual volume and the plunger piston (26) until the supply chamber (30) is again filled completely, j) Continuation with step b).

4. Process according to claim 1, characterised in that the material to be mixed (20) is shaped by a single-screw-type extruder (74), the outlet opening (82) of which, viewed in the direction of pressing, is tapered by at least one step (84) hindering flow movements of the material to be mixed (20).

5. Process according to claim 1, wherein the material (20) to be mixed is obtained by mixing a bulk starting material containing at least one particle size fraction of petroleum coke and/or graphite granules (1) with at least one binding agent (12), the bulk starting material having a material proportion of 65 to 95 wt. % and the binding agent (12) having a material proportion between 5 and 32 wt. % of the total mass of the material (20) to be mixed.

6. Process according to claim 5, characterised in that carbon fibres (14) are additionally added to the material (20) to be mixed before pre-pressing, these carbon fibres having a material proportion of 0 to 15 wt. % of the total mass of the material to be mixed.

7. Process according to claim 5, wherein auxiliary pressing agents (16) are additionally added to the material (20) to be mixed before pre-pressing, the auxiliary pressing agents having a material proportion of 0 to 5 wt. % of the total mass of the material to be mixed.

8. Process according to claim 5, characterized in that the bulk starting material and the binding agent (16) and further raw materials are mixed by a slow-running mixer, preferably by a tumble mixer or by a Rhön wheel mixer (18).

9. Process according to claim 5, wherein the bulk starting material is comminuted and screened before mixing in such a way that it essentially contains a first particle size fraction with particle sizes greater than 0 mm and smaller than 60 $\mu$m and with a material proportion of 20 to 100 wt. % of the bulk starting material, and a second particle size fraction with particle sizes of Go 4 M to 750 gm and a material proportion of 0 wt. % to 34 wt. % and a third particle size fraction with particle sizes greater than 750 gm to 2000 pm and a material proportion of 0 wt. % to 46 wt. %.

10. Component or semi-finished product made from synthetic graphite or from ceramic granules, in particular graphite tube (52) obtainable by a process involving shaping of a material (20) to be mixed preferably containing petroleum coke or graphite granules, by means of an extrusion press (22) or an extruder (56; 74) and characterized by the following steps:

a) Pre-pressing the material to be mixed (20) in static or quasi-static manner, flow movements of the material to be mixed (20) being stopped or impeded in such a way that particles previously irregularly arranged in the material to be mixed are initially aligned transversely to the direction of pressing, b) Pressing out of the pre-pressed material (20) to be mixed through an outlet opening (28; 61; 82) of the extrusion press (22) or the extruder (56; 74) in such a way that owing to adjusted flow properties of the material (20) to be mixed the particles within the pre-compressed material (20) to be mixed realign, starting from their transverse alignment, by an angle ($\beta$) of a maximum of 75° in the direction of pressing.

* * * * *